(No Model.) 3 Sheets—Sheet 1.
F. C. RIES & H. H. JOHNSON.
DENTAL ENGINE.

No. 572,030. Patented Nov. 24, 1896.

(No Model.) 3 Sheets—Sheet 2.

F. C. RIES & H. H. JOHNSON.
DENTAL ENGINE.

No. 572,030. Patented Nov. 24, 1896.

Witnesses.
Robert Emmitt
Thos. A. Gunn

Inventors.
Frederick C. Ries.
Henry H. Johnson.
By James L. Norris
Atty.

THE NORRIS PETERS CO., PHOTO-LITHO., WASHINGTON, D. C.

UNITED STATES PATENT OFFICE.

FREDERICK C. RIES AND HENRY H. JOHNSON, OF MACON, GEORGIA.

DENTAL ENGINE.

SPECIFICATION forming part of Letters Patent No. 572,030, dated November 24, 1896.

Application filed March 24, 1896. Serial No. 584,629. (No model.)

*To all whom it may concern:*

Be it known that we, FREDERICK C. RIES and HENRY HERBERT JOHNSON, citizens of the United States, residing at Macon, in the county of Bibb and State of Georgia, have invented new and useful Improvements in Dental Engines, of which the following is a specification.

This invention relates to that class of dental engines wherein an electric motor is mounted on a swinging bracket and serves to rotate a driving-shaft which extends longitudinally of the bracket and connects with a flexible shaft inclosed in a sheathing and in operative connection with the spindle of a hand dental instrument or tool-holder for the purpose of imparting motion to the drills, polishing-disks, and other tools employed by a dentist in operating on the teeth of a patient.

The chief objects of our invention, concisely stated, are to improve dental engines of the character referred to; to avoid the humming noise incident to the operation of dental engines of ordinary construction; to provide new and improved means whereby the flexible shaft of the hand dental instrument or tool-holder can be thrown out of operative connection with the driving-shaft which is mounted on the bracket, and the driving-shaft utilized as a lathe for grinding, polishing, or other purposes for which a dental lathe is ordinarily used by a dentist; to provide a new and improved construction of driving-shaft which will accommodate itself to any warping of the supporting-bracket; to provide means whereby the driving-shaft may be conveniently and quickly thrown into and out of operative connection with the motor-shaft; to provide novel means for operating the mallet of a mechanical dental plugging instrument; to provide a new and improved dental plugger which possesses fewer parts than heretofore, will not rattle, can be converted into a back-action instrument by reversing the mallet, and is provided with means for varying or regulating the strokes of the mallet to suit the conditions required, and to provide novel, simple, and convenient means for withdrawing saliva from the mouth and collecting the same in a suitable receptacle. To accomplish all these objects, our invention involves the features of construction, the combination or arrangement of parts, and the principles of operation hereinafter described and claimed, reference being made to the accompanying drawings, in which—

In order to enable those skilled in the art to make and use our invention, we will now describe the same in detail, referring to the drawings, wherein—

Figures 1, 2:
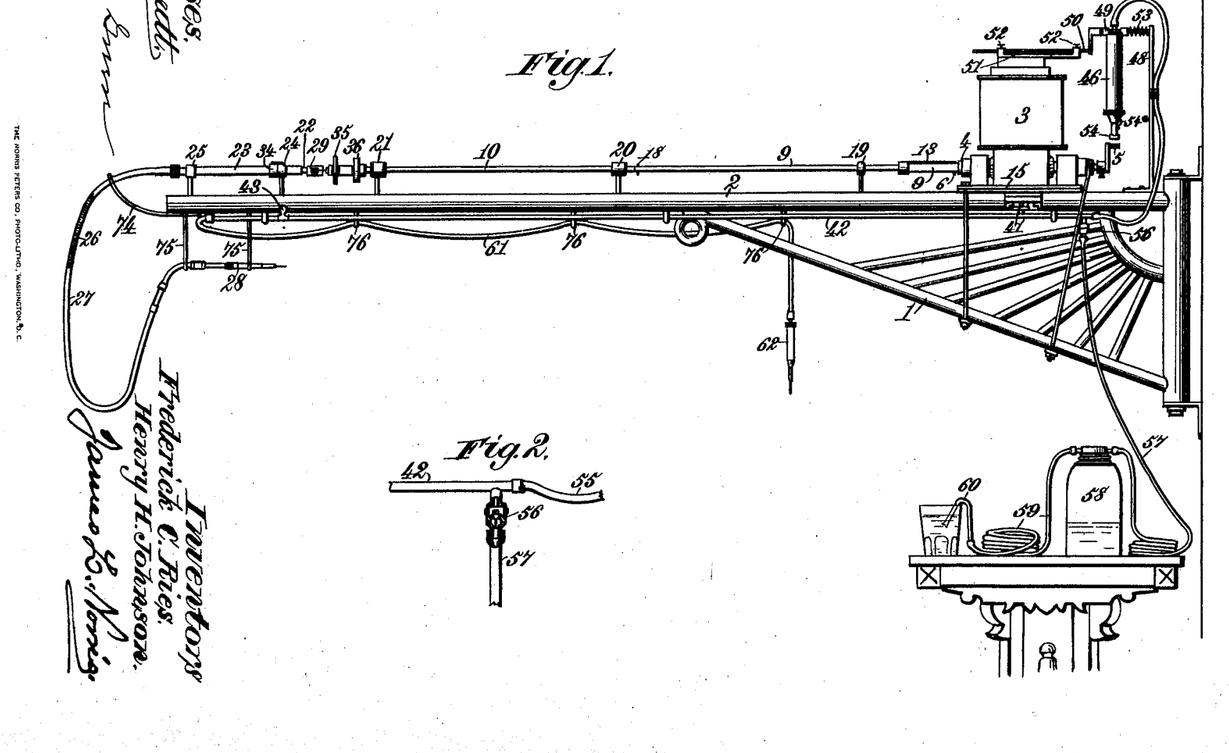
Figure 1 is a side elevation of an apparatus embodying our invention.
Fig. 2 is a detail view to show a suitable valve between the air-tube which leads to the dental plugger and the air-tube which leads to the saliva-collector.

The numeral 1 indicates a bracket having a horizontal arm 2 and pivoted to a wall or other support in the usual manner. The bracket-arm 2 supports an electric or other motor 3, having a rotary shaft 4, provided at one end with a crank or wrist pin 5 and at its other end with a cross-pin 6, (best seen in Fig. 7,) adapted to enter a slot 8, formed in one end of a driving-shaft, which is composed of a plurality of sections 9 and 10. The pin 6 of the motor-shaft is designed to engage an orifice 12, provided at one end of a leaf or snap spring 13 for the purpose of holding the driving-shaft in operative connection with the motor-shaft, while permitting these parts to be readily disconnected or thrown out of operative connection by simply raising the leaf or snap spring from engagement with the cross-pin of the motor-shaft and then moving the driving-shaft longitudinally a sufficient distance to free the slotted end 8 from the cross-pin of the motor-shaft. The extremities of the cross-pin 6 are preferably beveled, so that when the driving-shaft is moved lengthwise to engage it with the motor-shaft one of the beveled ends of the cross-pin will raise the leaf or snap spring 13 and hold it elevated until the cross-pin registers with the perforations 12, whereupon the leaf or snap spring will spring into engagement with the cross-pin. This construction is desirable in that it avoids the necessity of raising the leaf or snap spring when it is desired to connect the driving-shaft and motor-shaft together.

The electric or other motor 3 is mounted upon the bracket-arm through the medium of a spring-yielding support designed to absorb the usual humming noises, and thus produce a dental engine which will operate with less noise and be in a large measure free from the humming incident to dental engines of ordinary construction.

The spring-yielding support is composed of a flattened elastic plate 14, secured to the bracket-arms by suitable clips, and to which is bolted, screwed, or otherwise secured a flattened elastic plate 15, on which the electric motor is mounted. The provision of the two similar elastic or spring plates 14 and 15 avoids the humming noise produced by the operation of a motor when rigidly secured directly to the bracket-arm, as heretofore.

Figures 4, 5, 6, 7:
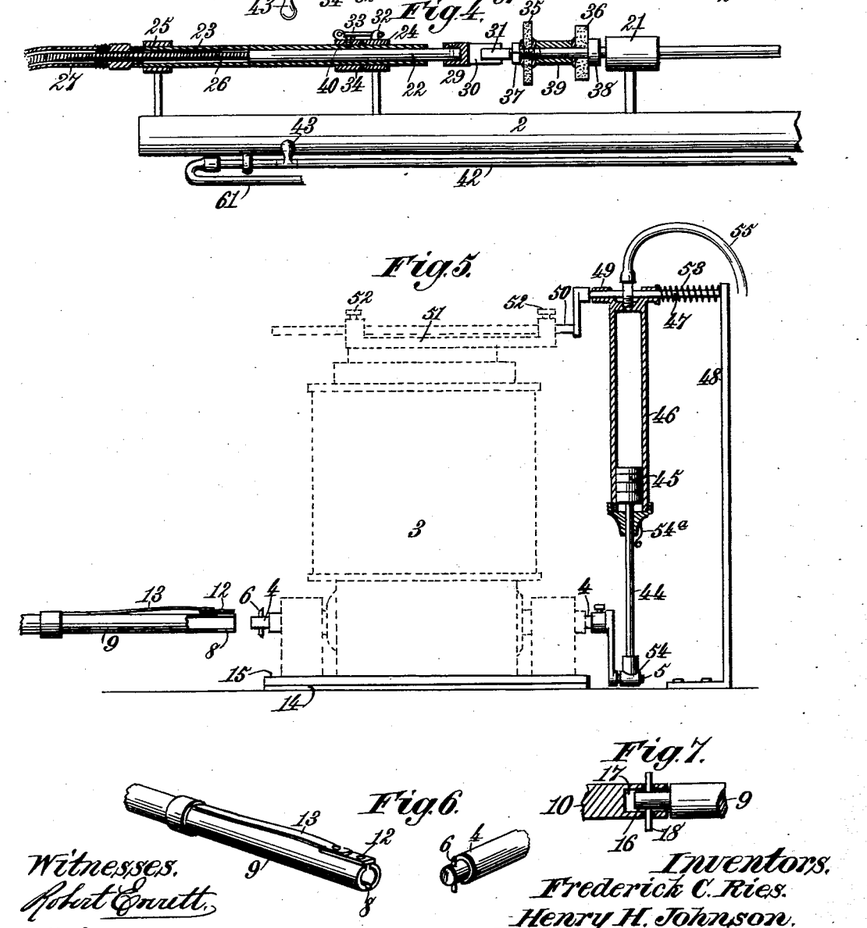
Fig. 4 is a sectional side elevation of the same.
Fig. 5 is a detail vertical sectional view of the air-pump of the forcing and exhausting mechanism for operating the dental plugger and withdrawing the saliva from the mouth and collecting it in a receptacle, showing the electric motor in dotted lines and a portion of the driving-shaft disconnected from the motor-shaft.
Fig. 6 is a detail perspective view showing a portion of the motor-shaft and a portion of the driving-shaft.
Fig. 7 is a detail sectional elevation showing the manner of connecting together the sections of the driving-shaft.

The driving-shaft may be composed of any desired number of sections, but, as shown in the drawings, it is composed chiefly of two sections 9 and 10, which are flexibly coupled together at their adjacent ends, as best seen in Fig. 7, through the medium of a tenon 16 on the outer extremity of the shaft-section 9, entering a socket 17 in the inner end of the shaft-section 10, a detachable pin 18 passing through the socketed end of the section 10 and through the tenon of the section 9.

The flexible connection of the shaft-sections is important for the purpose of rendering the driving-shaft susceptible of accommodating itself to any warping of the bracket from thermal or other effects; and, furthermore, the flexible connection tends to avoid the humming noise produced by the rapid vibrations imparted to a driving-shaft made in one piece or in rigidly-connected pieces mounted on a bracket-arm, as heretofore. The construction of the driving-shaft of flexibly-connected sections also enables the shaft to more readily accommodate itself to the positions of the bearings 20 and 21 in which the driving-shaft is journaled. These bearings are in the form of sleeves supported by posts or studs rising from the bracket-arm. When the driving-shaft is moved longitudinally to disengage it from the motor-shaft, the pin 18 of the flexible connection between the shaft-sections 9 and 10 may strike the sleeve-bearing 20, and thus limit the lengthwise movement of the driving-shaft. When the driving-shaft is shifted out of engagement with the motor-shaft, the inner end portion of the shaft-section 9 is properly supported by the sleeve-bearing 19, as will be obvious. It will of course be obvious, however, that any other desired form of stop may be employed.

Figure 3:
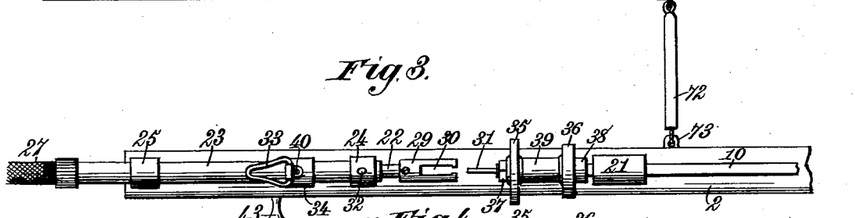
Fig. 3 is a detail plan view of a portion of the pivoted bracket, showing a device by which it may be held in a fixed position.

The outer extremity of the shaft-section 10 is designed to engage and disengage one extremity of a spindle 22, arranged in a tube 23, which is supported by sleeve-bearings 24 and 25, Figs. 1, 3, and 4, carried by posts or studs from the bracket-arm in a manner similar to the sleeve-bearings in which the driving-shaft sections are mounted. The spindle 22 is secured to one end of a flexible or wire shaft 26, Fig. 4, which extends through the ordinary sheathing 27 of braided material and operates the tool-spindle of the hand dental instrument 28, Fig. 1.

To provide for connecting and disconnecting the shaft-section 10 and the spindle 22, the inner end of the latter is provided with a head 29, having a rectilinear slot 30, designed to receive a flattened extension or tongue-piece 31 on the outer end of the shaft-section 10 in such manner that when the spindle 22 is moved in one direction by sliding the tube 23 longitudinally the flattened extension or tongue-piece 31 will enter the slot 30, after which the tube 23 is locked against longitudinal motion through the medium of a locking device composed, as here shown, of a pin 32, secured to the sleeve-bearing 24, and a loop 33, pivoted to a collar 34, which is secured in any suitable manner to the tube 23. When the spindle 22 and the shaft-section 10 are in operative connection, the loop 33 is swung over to engage the pin 32, as shown in Fig. 4, so that while the tube 23 is held stationary as regards movement in a direction away from the shaft-section 2 the spindle 22 is susceptible of moving longitudinally to a limited degree by reason of the slotted head 29 sliding on the flattened extension or tongue-piece 31, while remaining in operative connection therewith.

The sheathing 27 of the flexible shaft 26 is connected to the tube 23 and to the hand dental instrument, and consequently when the tube 23 is moved longitudinally in an outward direction, or away from the motor, the sheath 27 is correspondingly moved, and carries with it the flexible shaft 26, which in turn moves the spindle 22 longitudinally to disengage the head 29 from the tongue-piece 31. Obviously a reverse motion of the parts enables the head of the spindle to be engaged with the tongue-piece for the purpose of placing the spindle in operative engagement with the section 10 of the sectional driving-shaft.

The outer end portion of the shaft-section 10 is designed to carry grinding and polishing disks or wheels, as at 35 and 36, in such manner that by disconnecting the spindle 22 from the shaft-section 10 of the driving-shaft the apparatus can be utilized as a laboratory lathe, or as a lathe for grinding, polishing, and other purposes for which a lathe is ordinarily used by a dentist.

To disconnect the spindle 22 from the shaft-section 10 it is only necessary to raise the loop 33 from engagement with the pin 32 and then slide the tube 23 in an outward direction until the slotted head 29 is free from engagement with the flattened extension or tongue-piece of the shaft-section 10. The driving-shaft can then be rotated by the motor-shaft without imparting rotary motion to the tool-spindle of the hand dental instrument.

The disk or wheel 35 may be an ordinary corundum or other grinding-wheel, while the disk 36 may be a polishing-brush. The grinding or polishing disks or wheels are designed to be clamped upon the shaft-section 1 through the medium of a nut 37, screwed upon a part of the shaft-section, as will be readily understood by reference to Figs. 3 and 4. The disk or wheel 36 bears against a shoulder 38 on the shaft-section 10. A spacing collar or sleeve 39 is interposed between the disks or wheels to hold them at a fixed distance apart, and the nut 37 acts against the disk 35, so that the disks or wheels and the spacing collar or sleeve are all firmly clamped to the shaft-section and will rotate therewith.

As before stated, the spindle which drives the flexible wire shaft can be thrown out of operative connection with the section 10 of the driving-shaft, and consequently the hand dental instrument can be cut off from the driving-shaft and the motor and the grinding and polishing lathe be operated or run entirely independent of the tool-carrier in the hand dental instrument. This is very desirable and advantageous over that type of dental engines wherein the tool-spindle of the hand dental instrument must rotate while a polishing or grinding disk or wheel is in operation.

The loop 33, designed to engage the pin 32, is arranged in a clip, which is secured to the collar 34 through the medium of a set-screw 40, which serves also to secure the collar 34 in a fixed position on the tube 23. It is therefore possible to adjust the collar 34 on the tube 23 with relation to the sleeve-bearing 24. This may be necessary when changes are made at the hand dental instrument which lengthen or shorten the flexible wire shaft 26 and change the relative position of the slotted head 29 and the flattened extension or tongue-piece 31. When the tube 23 is moved inward to engage the slotted head 29 with the flattened extension or tongue-piece 31, the collar 34 will, at the proper time, abut the sleeve-bearing 24 and thus limit the inward-sliding movement of the tube 23, so that the slotted head and the extension or tongue-piece will always be properly engaged with each other.

The electric motor may be of any construction suitable for the purpose in hand, and as this type of motors is well known we do not deem it necessary to more fully illustrate the same in the drawings.

The usual pole-changer or switch (indicated by the numeral 41) is employed for the purpose of reversing the motor, as usual. This pole-changer or switch, as here shown, is arranged under the motor at one side of the bracket-arm and is designed to be operated by an air-conveying tube 42, which is mounted in suitable bearings on the bracket-arm, and is more fully hereinafter explained.

The motor may be started and stopped through the medium of a foot presser or pedal, which is well known and therefore requires no illustration.

The pole-changer or switch is employed to reverse the motor for the purpose of changing the direction of motion of the drill or other tool connected with the drill-spindle of the hand dental instrument 28, all of which is well known. Pole-changers or switches are known which serve to start and stop and reverse the electric motor, and such may be employed, if desired, and be operated by the lengthwise-movable air-conveying tube 42. This tube is provided with a handle, preferably in the form of a knob 43, Fig. 1, by which the tube may be moved longitudinally in either direction to adjust or operate the pole-changer or switch.

The shaft of the electric motor is designed to operate an air forcing and exhausting device or pump, which serves to actuate the mallet of a dental plugging instrument and to extract or withdraw saliva from the mouth of a patient and deposit it in a suitable receptacle. For this purpose the crank or wrist pin 5, before referred to, is provided on one end of the motor-shaft and engages the outer end of a piston-rod 44, having at its inner end a piston 45, working within a cylinder 46, which is pivotally suspended from a horizontal shaft 47, extending from an upright or standard 48, rising from the bracket-arm. The cylinder 46, as here shown, is adapted to oscillate, and for this purpose its upper end is provided with a sleeve 49, through which the shaft 47 extends.

The shaft 47 is connected at the end opposite the upright or standard 48 with a slide bar or rod 50, adjustably mounted in a clamp 51, arranged on the upper end of the motor-frame and having set-screws 52, by which to clamp the slide bar or rod 50 in position after it has been properly adjusted in relation to the motor for the proper engagement of the piston-rod with the crank or wrist pin 5. A spiral or other suitable spring 53 is arranged to act upon the sleeve 49, and thus force the pump-cylinder in a direction toward the electric motor, and at the same time permit the cylinder to be shifted in a direction away from the motor. The purpose of this is to enable the eye or socket 54 on the outer end of the piston-rod 44 to be conveniently and quickly engaged with and disengaged from the crank or wrist pin 5, so that the piston of the cylinder can be thrown into and out of operative connection with the motor-shaft.

The slide bar or rod 50 and the clamp 51 enable the pump above described to be accurately adjusted with relation to the moter after the latter has been attached to the bracket-arm in such manner that the parts will correctly operate, and the piston-rod of the pump-piston can be readily engaged with and disengaged from the crank or wrist pin of the motor-shaft.

The upper end of the pump-cylinder 46 is connected by a rubber or other flexible tube 55 with the inner or rear end of the lengthwise-movable air-conveying tube 42. This tube 42 is provided in proximity to its inner or rear end with a check-valve 56. (Best seen in Fig. 2.) This valve connects by a flexible or other tube 57 with the mouth or upper end of a suitable saliva-receptacle 58. The mouth or upper end of this receptacle also connects with one end of a flexible or rubber tube 59, to the other end of which is attached a saliva extracting or withdrawing tube or other device 60, suitably constructed to be placed into the mouth of a patient for the purpose of extracting or withdrawing saliva therefrom by the air-suction created in the tubes 55, 57, and 59, as will hereinafter appear.

The front end of the longitudinally-movable air-conveying tube 42 is connected to one end of a rubber or other flexible tube 61, the other end of which is operatively connected with a dental plugging instrument comprising a cylindrical or other suitably-shaped tubular casing 62, which contains a reciprocatory mallet 63, the construction being such that when the pump-piston 45 is reciprocated by the motor-shaft air is alternately forced through and exhausted from the tubes which connect the pump-cylinder with the dental plugging instrument and the saliva receptacle and extracting device. In the upstroke of the pump-piston 45 air is forced through the tubes 55, 42, and 61, and, entering the tubular casing of the dental plugging instrument, drives the mallet 63 forward, it being understood that at the beginning the mallet 63 lies entirely or partially retracted from the outer end of the casing to which the plugging-tool is attached, as usual.

When air is forced by the action of the pump, the check-valve 56 closes, and consequently the forced air is not driven into the saliva-receptacle; but on the downstroke of the pump-piston suction is created and air is exhausted from the tubes 61, 42, 59, 57, and 55, so that two things occur, to wit: first, the mallet 63 is retracted or moved inward and suction is created in the saliva-receptacle 58 and saliva-extracting device 60, and therefore the latter can at any time be used by the dentist for extracting or withdrawing saliva from the mouth of a patient. The saliva extracted or withdrawn is delivered into the saliva-receptacle 58, and, inasmuch as the saliva is of greater specific gravity, it naturally precipitates to the bottom of the receptacle. This receptacle should be emptied from time to time to avoid any undue accumulation of matter therein.

As regards the check-valve 56, it may be of any construction suitable for the purpose, and it may be arranged at any point where it will perform the function of preventing the forced air being driven into the saliva-receptacle, while permitting air to be exhausted from such receptacle.

Figure 8:
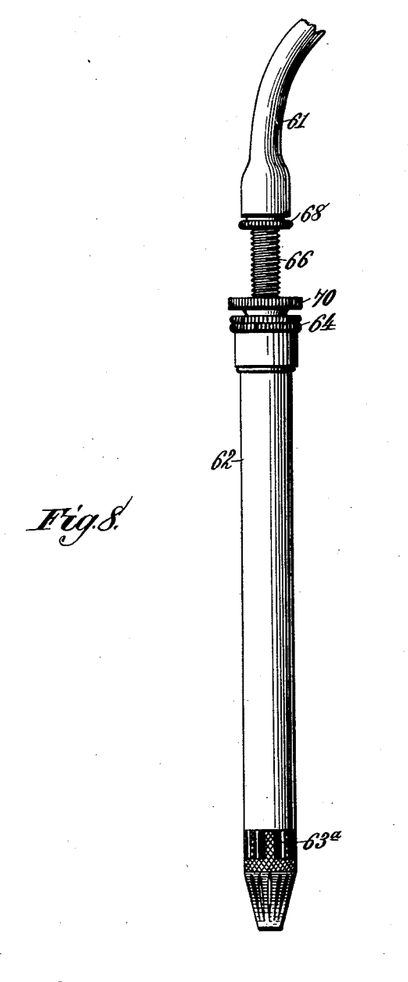
Fig. 8 is a detail side elevation of the dental plugging instrument.
Figure 9:
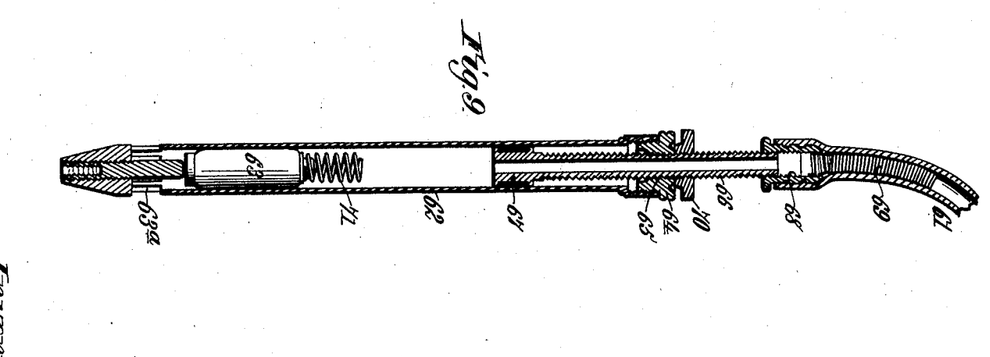
Fig. 9 is a longitudinal central sectional view of the same.

The dental plugging instrument is best illustrated in Figs. 8 and 9, and its simplicity of construction renders it very advantageous and useful.

The outer end of the cylindrical casing of the plugger is constructed with a plurality of lateral orifices 63$^a$ for the inlet and outlet of air during the operation of the mallet. A sufficient number of these orifices should be employed to permit the inflow and outflow of air during such time as the dentist holds the plugger between his fingers, as ordinarily the instrument is grasped by the fingers at or near the point where the air-orifices are arranged.

The inner end of the cylindrical casing is provided with a screw-threaded plug 64, having a central screw-threaded opening 65, with which engages an externally-screw-threaded tubular stem 66, having at its inner end a disk-shaped head 67, which fits closely against the internal surface of the casing.

The outer end of the tubular screw-threaded stem 66 is provided with a tip 68, having a groove in its exterior surface. This grooved tip serves for the attachment of one end of the flexible or rubber tube 61, and to secure a strong, substantial, and durable construction a flexible wire spring or section 69 may be arranged in the flexible or rubber tube 61 and be secured to the tip 68 of the screw-threaded tubular stem 66. This stem 66 can be adjusted lengthwise by rotating it in one or the other direction, and after the desired adjustment has been effected the stem can be locked in position through the medium of a lock-nut 70, engaging the screw-threaded stem and adapted to bear against the screw-threaded plug 64. The object of adjusting the tubular stem lengthwise is to change or vary the strokes of the mallet and enable these strokes to be made longer or shorter to suit whatever conditions may be required.

It will be obvious that the rapidity of motion of the mallet is regulated by the speed of the motor and air-pump and that if the tubular screw-threaded stem 66 be adjusted inwardly the strokes of the mallet are shortened, and, conversely, if the stem be adjusted outwardly the strokes are lengthened.

The mallet described is susceptible of being reversed, for the purpose of converting the plugger into a back-action instrument, and to accomplish this the mallet is provided at one end with a cushion, which, as here illustrated, is in the form of a spiral spring 71, having one extremity secured in any suitable manner to one end of the mallet. If the mallet be arranged as shown in Fig. 9, with the spiral-spring cushion interposed between the same and the disk-shaped head 67 of the stem 66, the effective stroke of the mallet will be as it is thrown outward, with its impacting portion arranged to strike the holder in which the plugging-tool is secured. If, however, the position of the mallet be reversed and the spiral-spring cushion be placed outermost, so that it will strike the holder of the plugging-tool, the effective stroke of the mallet will be on the back stroke, or when it is thrown inward and impacts against the head 67 of the stem 66. The mallet can be reversed by simply unscrewing the plug 64 and moving it, with the stem 62, from the casing. It will therefore be obvious that the mallet can be very conveniently and quickly reversed and converted into a back-action mallet, or one wherein the effective or working stroke is made either as the mallet moves outward or as it moves inward.

The lock-nut 70, which serves to lock the screw-threaded stem in its adjusted position, effectually prevents the stem from jarring or rattling, and the spiral spring 69 and grooved tip 68 of the stem, to which the elastic or rubber tube is secured, prevent the end of the rubber tube from kinking and choking, which would interfere with the free passage of air.

The object of making the mallet reversible, so that it can be converted into a back-action mallet, is to enable the instrument to be used with a plugging-hook or back-action point, as with this class of plugging-tool the effective stroke of the mallet should be away from the tip of the instrument.

The plugging instrument described is obviously very simple in construction in that it comprises very few parts, and yet with these few parts it is convertible into a back-action instrument, which is very desirable and useful.

The air forcing and exhausting mechanism, composed of a pump of the general character described, is designed to be thrown out of operative connection with the motor-shaft, so that in using the lathe a higher velocity of the grinding and polishing disks or wheels can be obtained, and, furthermore, while using the dental engine as a lathe it is unnecessary to run and unduly wear the pump devices.

The same remarks apply to the operative connection of the hand dental instrument 28 with the driving-shaft; that is to say, the hand dental instrument can be cut off from operative connection with the driving-shaft, and the latter can be run alone when the lathe is desired for any purpose. The object of throwing the sectional driving-shaft into and out of operative connection with the shaft of the motor is that when the dental plugging instrument is in use the flexible driving-shaft can be disconnected from the motor-shaft, and consequently the wearing of this shaft is avoided during the time that the motor is used to drive the pump which operates the plugging instrument and the saliva-extracting devices. The disconnection of the motor-shaft from the flexible driving-shaft also enables the pump to be operated at greater speed than is attainable with the motor-shaft permanently coupled to the flexible driving-shaft. The connection and disconnection of the pump piston-rod and the crank or wrist pin of the motor-shaft are easily effected by shifting the pump-cylinder on the supporting-shaft 47. When the pump piston-rod is disconnected from the crank or wrist pin, the piston-rod can be pushed inward until its eye or socket 54 is engaged by the free end portion of a leaf-spring 54$^a$, secured to the lower cylinder-head, by which means the piston-rod is held retracted and entirely out of the way during such time as it is not desired to operate the pump.

The provision of means whereby the shaft which operates the dental tool can be conveniently and quickly disconnected from the shaft of the motor is a very important part of our invention in that while using the dental plugging instrument the plugger is necessarily stopped and started very frequently, and the stopping and starting should be effected instantly. By disconnecting the shaft which operates the dental tool from the motor-shaft the stopping and starting of the plugging instrument is more quickly effected than if the said shaft were constantly in operative connection with the motor-shaft. When the dentist or operator picks up gold with the point of the plugger and carries it to the filling, the instant it is against the filling the motor is started by him and the blows of the plugger instantly commence. Obviously, the plugger will start quicker when the motor only requires to operate the air-pump, and, furthermore, less current or motive power is required. Inasmuch as the plugger must be stopped and started each time the dentist or operator requires to pick up gold and carry it to the filling, the swift stopping and starting of the plugger is very advantageous.

The saliva-extractor is principally used during the operation of gold-filling, and consequently it is also advantageous and important to disconnect the shaft from the motor during the filling of a cavity, for the purpose of securing the best operation of the saliva-extractor and plugger.

When the dental engine or apparatus is converted into a lathe, it is desirable to hold the bracket-arm stationary during the time that the lathe is in operation, and this may be accomplished in any suitable manner, but, as shown in Fig. 3, we provide a brace 72, which can be jointed at one end to a wall or other support and at the other end be engaged with and disengaged from an eye 73, provided on the bracket-arm.

The outer end of the bracket-arm may be provided with a forked or other suitable device 74 for supporting the flexible shaft which transmits motion from the spindle 22 to the tool-holder of the dental instrument 28. The bracket-arm may also be provided with hooked supports 75 for supporting the dental instrument 28 when the latter is not in use, as shown in Fig. 1.

The handle or knob 43 for shifting the air-conveying tube 42 longitudinally is located near the outer end of the tube, so that the operator can conveniently manipulate the handle or knob while operating on the patient.

As shown in Fig. 1, the saliva-receptacle 58 is placed upon a table arranged under the pivoted bracket, but this table is only represented as typical of many different supports that may be employed for supporting the saliva-receptacle. In practice we suspend the saliva-receptacle under the usual cuspidor provided at one side of the dental chair, so that the receptacle is out of the way and is not prominently exposed to view.

As indicated by Fig. 1, the flexible or rubber tube 61 may be supported when not in use through the medium of hooked supports 76, similar to the hooked supports 75 which support the hand dental instrument when not in use.

Having thus described our invention, what we claim is—

1. The combination with a supporting-arm provided with shaft-bearings, a motor mounted upon said arm and having a rotary shaft, and a tool-holding dental instrument, of a driving-shaft connected at one end with and driven by said motor and journaled in the shaft-bearings on the supporting-arm, a rotary spindle movable on said supporting-arm into and out of engagement with the end of the driving-shaft opposite the motor, supports arranged on the supporting-arm and in which said spindle is mounted, and a flexible shaft for connecting the rotary spindle with the tool-holding dental instrument, said supporting-arm carrying and sustaining the spindle both when it is engaged with and when it is disengaged from the driving-shaft, substantially as described.

2. The combination with a supporting-arm, a motor having a rotary shaft, and a tool-holding dental instrument, of a driving-shaft driven by said motor and composed of yieldingly-connected sections journaled in bearings on the supporting-arm, a rotary spindle having a head constructed to engage and disengage the end of one of said yieldingly-connected driving-shaft sections, a flexible shaft for connecting said spindle with the tool-holding dental instrument, and a lengthwise-movable tube supported in bearings on said supporting-arm and in which the spindle rotates, said supporting-arm carrying and sustaining the said spindle, both when it is engaged with and when it is disengaged from the said section of the driving-shaft, substantially as described.

3. The combination with a swinging supporting-arm, a motor having a rotary shaft, and a tool-holding dental instrument, of a driving-shaft composed of sections yieldingly connected together at their ends and journaled on the supporting-arm, a rotary spindle mounted on the supporting-arm, means whereby said spindle may be moved into and out of engagement with a part of said sectional driving-shaft, and a flexible shaft for connecting said spindle with the tool-holding dental instrument, said supporting-arm carrying and sustaining the said spindle both when it is engaged with and when it is disengaged from said driving-shaft, substantially as described.

4. The combination with a supporting-arm, a motor having a rotary shaft, and a tool-holding dental instrument, of a driving-shaft driven by said motor and journaled in bearings on the supporting-arm, a rotating and lengthwise-movable spindle having a head constructed to engage and disengage one end of said driving-shaft, a flexible shaft for connecting said spindle with the tool-holding dental instrument, a lengthwise-movable tube arranged in bearings on said supporting-arm and in which the said spindle rotates and is movable longitudinally, a sheath inclosing the flexible shaft and connected to said lengthwise-movable tube, and a movable locking device for retaining the tube to hold the spindle in operative engagement with the driving-shaft, substantially as described.

5. The combination with a supporting-arm, a motor having a rotary shaft, and a tool-holding dental instrument, of a driving-shaft composed of sections yieldingly connected together and journaled on the supporting-arm, a movable tube carried by said supporting-arm, a rotary spindle arranged in the tube and having means to detachably engage the driving-shaft and moved into and out of engagement with said shaft by said tube, and a flexible shaft for connecting said spindle with the tool-holding dental instrument, said supporting-arm carrying and sustaining the said movable tube and rotary spindle both when said spindle is engaged with and when it is disengaged from the driving-shaft, substantially as described.

6. The combination with a supporting-arm, a motor having a rotary shaft, and a tool-holding dental instrument, of a driving-shaft journaled in bearings on the supporting-arm and driven by the motor, a flexible shaft connected with the tool-holding dental instrument, a spindle connected with and serving to operate said flexible shaft, coupling devices detachably and yieldingly connecting said spindle with the said driving-shaft, and a lengthwise-movable tube arranged in bearings on the supporting-arm and in which the spindle rotates and by which said spindle is moved to connect and disconnect said coupling devices, whereby the spindle is thrown into and out of operative connection with the driving-shaft, substantially as described.

7. The combination with a supporting-arm, a motor having a rotary shaft, and a tool-holding dental instrument, of a spindle connected with the tool-holder of the dental instrument and having a slotted head, a driving-shaft driven by the motor and provided at one end with a tongue-piece which enters the slotted head of the spindle, a movable tube mounted on the supporting-arm and in which the spindle rotates, and means whereby the movement of the tube serves to connect the spindle with and disconnect it from the driving-shaft, substantially as described.

8. The combination with a supporting-arm, a motor having a rotary shaft, and a tool-holding dental instrument, of a movable spindle having a slotted head and connected with the tool-holder of the dental instrument, a driving-shaft driven by the motor and composed of yieldingly-connected sections, one of which is provided with a tongue-piece which enters the slotted head of the spindle, a movable tube mounted on the supporting-arm and constituting a bearing for the spindle, and means whereby the movement of the tube serves to move the spindle into and out of engagement with the said tongue-piece, substantially as described.

9. The combination with a supporting-arm, a motor having a rotary shaft, and a tool-holding dental instrument, of a spindle connected with the tool-holder of the dental instrument and provided with a slotted head, a driving-shaft journaled on the supporting-arm, driven by the motor and composed of sections yieldingly fitted at their ends one into another, one of the sections having a tongue-piece with which the slotted head of the spindle is adapted to engage, a movable tube mounted on the supporting-arm and constituting a bearing for the spindle, and means whereby the movement of the tube serves to connect and disconnect the spindle and the said tongue-piece of the driving-shaft, substantially as described.

10. The combination with a supporting-arm, a motor having a rotary shaft, and a tool-holding dental instrument, of a driving-shaft composed of a series of yieldingly-connected sections journaled on the supporting-arm, a spindle connected with the tool-holder of the dental instrument and having means to engage and disengage the sectional driving-shaft, a movable tube mounted on the supporting-arm and constituting a bearing for the spindle, and means whereby the movement of said tube serves to move said spindle into and out of engagement with said sectional driving-shaft, substantially as described.

11. The combination with a motor, a driving-shaft driven by the motor, and a dental plugging instrument, of an air-pump operated by the motor which actuates the driving-shaft, an air pipe or tube connecting the air-pump with the dental plugging instrument, a closed saliva-receptacle, an air pipe or tube connecting the saliva-receptacle with the air-pump, a saliva-extractor, and an air pipe or tube connecting the saliva-extractor with the closed saliva-receptacle, substantially as described.

12. The combination with a motor of a dental engine, of an air-pump operated by the motor-shaft, a saliva-receptacle independent of said motor, a pipe or tube connected with said saliva-receptacle and serving for the passage of air moved by the air-pump, a saliva-extractor, and a pipe or tube connecting the saliva-extractor with the independent saliva-receptacle, substantially as described.

13. The combination with a bracket-arm, and a motor mounted thereupon, of an air-pump driven by the motor-shaft, a dental plugging instrument, a closed saliva-receptacle, tubular connections between the air-pump, the dental plugging instrument and the saliva-receptacle, and a saliva-extractor, substantially as described.

14. The combination with a support, and a motor, of a dental plugging instrument, a pump-cylinder, connections between the pump-cylinder and the dental plugging instrument, a piston working in said cylinder and having a piston-rod detachably connected with the motor-shaft, and a device for holding the piston-rod retracted and out of the path of the motor-shaft when said piston-rod is disconnected from said shaft, substantially as described.

15. The combination with a suitable support, and an electric motor mounted thereupon and provided with a pole-changer or switch, of a movable air-conveying tube mounted on the support and serving to operate the pole-changer or switch, an air-pump driven by the motor-shaft, a tubular connection between the pump and one end of the air-conveying tube, and a dental plugging instrument connected with the other end of the air-conveying tube and having a mallet which is reciprocated by the action of the pump, substantially as described.

16. A dental plugging instrument having a reciprocatory mallet, and an adjustable screw-threaded tubular stem provided at its outer end with a tip, in combination with a lock-nut mounted on the screw-threaded stem, and an air-conveying tube secured to the tip of said stem, substantially as described.

17. The combination with the supporting-arm, and the motor of a dental engine, of a spring-yielding support interposed between the base of the motor and the supporting-arm, and yieldingly connecting the two together, substantially as and for the purposes described.

18. The combination with a pivoted bracket-arm, a dental instrument, a driving-shaft journaled on the bracket-arm and connected with the dental instrument, and an electric motor for operating the driving-shaft, of a spring-yielding connection between the base of the motor and the supporting-arm, substantially as and for the purposes described.

19. The combination with a bracket-arm, a rotatable shaft carried thereby, and an electric motor, of an elastic plate secured to the bracket-arm, and an elastic plate secured to the motor and supported by the elastic plate on the supporting-arm, substantially as and for the purposes described.

20. The combination with a bracket-arm, a dental instrument, and an electric motor, of a driving-shaft driven by the motor and composed of sections yieldingly connected at their ends, and a spring-yielding support interposed between the motor and the supporting-arm, and connecting the two together, substantially as and for the purposes described.

21. The combination with a swinging supporting-arm, and a motor mounted thereupon and having a rotary shaft, of a driving-shaft mounted in bearings on said arm and movable into and out of engagement with the motor-shaft, and a support, as 19, which sustains the end of the shaft when disengaged from the motor-shaft, substantially as described.

In testimony whereof we have hereunto set our hands in presence of two subscribing witnesses.

FREDERICK C. RIES.
HENRY H. JOHNSON.

Witnesses:
C. H. PEETS,
D. A. BROWN.